United States Patent [19] [11] 4,028,250
Loft [45] June 7, 1977

[54] FILTRATION APPARATUS
[75] Inventor: John T. Loft, Summit, N.J.
[73] Assignee: Amerace Corporation, New York, N.Y.
[22] Filed: May 30, 1975
[21] Appl. No.: 582,453
[52] U.S. Cl. .............................. 210/259; 210/345; 210/347; 210/433 M; 210/487; 210/494 M; 210/496
[51] Int. Cl.² ......................................... B01D 31/00
[58] Field of Search ............ 210/496, 491, 494 M, 210/321, 490, 489, 506, 487, 345, 347, 433 M, 259

[56] References Cited
UNITED STATES PATENTS

| | | | |
|---|---|---|---|
| 3,400,825 | 9/1968 | Shippey | 210/321 |
| 3,417,870 | 12/1968 | Bray | 210/494 X |
| 3,442,389 | 5/1969 | Mendelson | 210/491 X |
| 3,457,170 | 7/1969 | Havens | 210/321 X |
| 3,494,470 | 2/1970 | Banfield | 210/321 |
| 3,585,131 | 6/1971 | Esmond | 210/321 |
| 3,643,805 | 2/1972 | Hoffman | 210/321 |
| 3,648,754 | 3/1972 | Sephton | 210/321 X |
| 3,862,030 | 1/1975 | Goldberg | 210/494 X |

Primary Examiner—Frank A. Spear, Jr.
Attorney, Agent, or Firm—S. Michael Bender; Gregory J. Battersby; Ken Richardson

[57] ABSTRACT

Filtration apparatus comprising at least one microporous member having at least a pair of opposed surfaces and a predetermined thickness, a tubular member positioned with respect to at least one of said opposed surfaces whereby fluid passing through said microporous member is filtered and the filtrate is received by said tubular member for distribution and/or collection.

12 Claims, 8 Drawing Figures

FILTRATION APPARATUS

BACKGROUND OF THE INVENTION

This invention relates generally to filtration apparatus and, more particularly, to apparatus comprising at least one microporous member cooperatively positioned relative to a tubular member to effect removal of particles suspended or dissolved in a fluid medium.

The present invention is particularly useful as a pre-ultrafilter in a desalinization system employing a reverse osmosis membrane module. In systems of this type, seawater is passed, under pressure, through a semipermeable membrane with the desalinized water or permeate being recovered on the opposite side of the membrane. The dissolved salts are separated from the seawater and remain on the influent side of the membrane. A reverse osmosis desalinizaton system of the foregoing type is described in greater detail in copending U.S. patent application, Ser. No. 539,510, filed Jan. 8, 1975, entitled REVERSE OSMOSIS APPARATUS, and assigned to the same assignee as the present application. The aforementioned Application, Ser. No. 539,510, is hereby incorporated herein by this reference and made part of this disclosure.

The use of a pre-filter, especially a pre-ultrafilter, in a reverse osmosis seawater desalinization system is particularly important due to the present of porteinaceous matter in the seawater. If no pre-filter were employed this proteinaceous matter would become trapped on the semipermeable membrane, thus coating the membrane and reducing the efficiency of the system.

As a result, most reverse osmosis systems employ a pre-filter of some type, preferably a pre-ultrafilter. Of those pre-filters employed, the most common are diatomaceous earths, sand filters and cartridge type filters. The most common ultrafilter used employs cellulose acetate as the filtering media. This type of ultrafilter has several disadvantages for use in a reverse osmosis system. The cellulose acetate filter media requires some structural support due to its limited thickness and inherent weakness. As such, special mounting fixtures or hardware are required to incorporate such ultrafilters into conventional reverse osmosis systems. This hardware generally differs from the components used for the reverse osmosis membrane module thus requiring the stocking of many different non-interchangeable parts and thereby increasing the overall cost of the system.

Additionally, the ultrafiltration systems heretofore employed, especially those employing cellulose acetate, require that the filter media be kept moist at all times. Should, for any reason, the filter media be allowed to dehydrate, its filtering properties become severly reduced requiring immediate replacement. Not only does this necessitate the use of elaborate means to insure that the filter media will not dehydrate, but operation in such a constantly moist environment provides an ideal medium for bacterial growth. Since, it is well known that ultrafiltration media heretofore employed, especially cellulose acetate, are subject to bacterial attack, the life expectancy of these ultrafilters is limited.

Ultrafiltration apparatus heretofore employed suffer from the additional disadvantage of not being totally solvent resistant. Since, from time to time, solvents do enter the system, this serves to further reduce the life expectancy of such filter assemblies.

The filtration apparatus of the present invention may also be employed in a number of other filtration systems including, for example, use in connection with known electropainting systems. In these systems, metal parts to be painted are electrically charged and chemically treated to insure better adhesion prior to immersion in paint tanks where electrically charged resin and pigment solids are deposited on their surfaces. The part is then rinsed in a water rinse tank where excess resin and pigment are removed. The rinse water is then passed through an ultrafilter to recover any excess resin and pigment contained therein and then reused.

Additionally, the filtration apparatus of the present invention may successfully be utilized as an ultrafilter medium for separating protein from cheese whey prior to disposal of the processed whey. The presence of this proteinaceous matter in cheese whey pollutes the environment when disposed of in surroundng bodies of water.

Ultrafiltration has also been employed recently in the fractionation of blood. The apparatus of the instant invention is readily adaptable for use in such systems as well.

Against the foregoing background, it is a primary objective of the present invention to provide improved filtration apparatus comprising at least one microporous member and a support for said member provided in the form of tubular member.

It is another object of the present invention to provide improved filtration apparatus which maintains its stability and effectiveness over a relatively long period of use and which is relatively inexpensive to fabricate.

SUMMARY OF THE INVENTION

To the accomplishment of the foregoing objects and advantages, the present invention, in brief summary, comprises filtration apparatus including at least one micorporous member cooperatively positioned relative to a tubular member, means for directing the flow of a fluid medium to be filtered to and through the micorporous member and means for directing the flow of the filtered fluid medium to suitable collection and distribution means.

In one preferred embodiment, the apparatus of the invention may be constructed in a spiral wound configuration about a center tube through which the filtrate may pass to means for collection or distribution or, alternatively, in serpentine configuration about a cylindrical tube. In an alternatively preferred embodiment of the invention means are provided for the singular wrapping of the filter media either about or within a cylindrical tube.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

DESCRIPTION OF THE PREFERRED EMBODIMENTS

Figure 1:
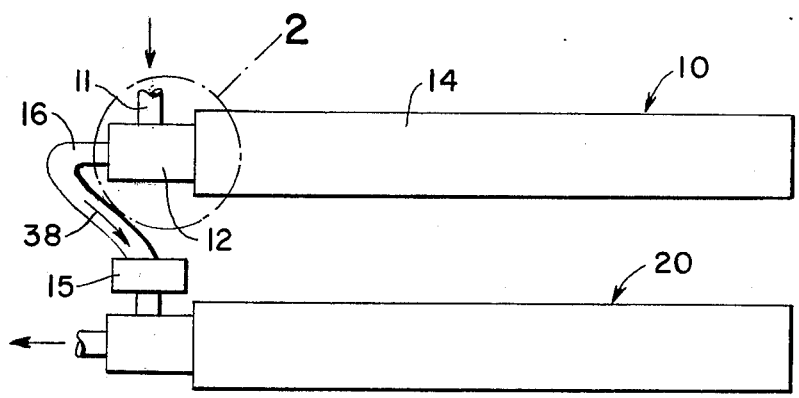
FIG. 1 illustrates schematically a reverse osmosis system incorporating the filtration apparatus of the present invention.

Referring now to FIG. 1, there is schematically shown a portion of a reverse osmosis system in which the filtration apparatus of the present invention is employed as a pre-ultrafilter in the form of a module 10 cooperatively associated with a reverse osmosis membrane module 20. In the operation of the system illustrated, seawater which is intended to be desalinized, for example, initially enters and passes through pre-ultrafilter module 10 prior to introduction into the reverse osmosis membrane module 20. The seawater or fluid medium being processed is caused to flow through the module 10 under a suitable drive pressure, e.g., up to about 100 psig, established by a pump or other pressure supply means (not shown). Since the pre-ultrafilter module will normally have a relatively greater flow rate compared to the reverse osmosis membrane module, it is contemplated that one pre-ultrafilter module 10 may function as an input stage supplying more than one reverse osmosis membrane module 20 in, for example, a parallel configuration (not shown). A pump 15 or other similar device is positioned between the pre-ultrafilter module 10 and the reverse osmosis module 20 to increase the pressure of the water as it enters the reverse osmosis module 20 to between about 400 psig and about 1000 psig, for example. In any event, the use of the pre-ultrafilter module 10 avoids premature membrane failure of the reverse osmosis membrane module 20 in that it prevents solid particles from coating or otherwise reducing the permeability of the delicate membrane of the module 20.

Figures 2, 3:
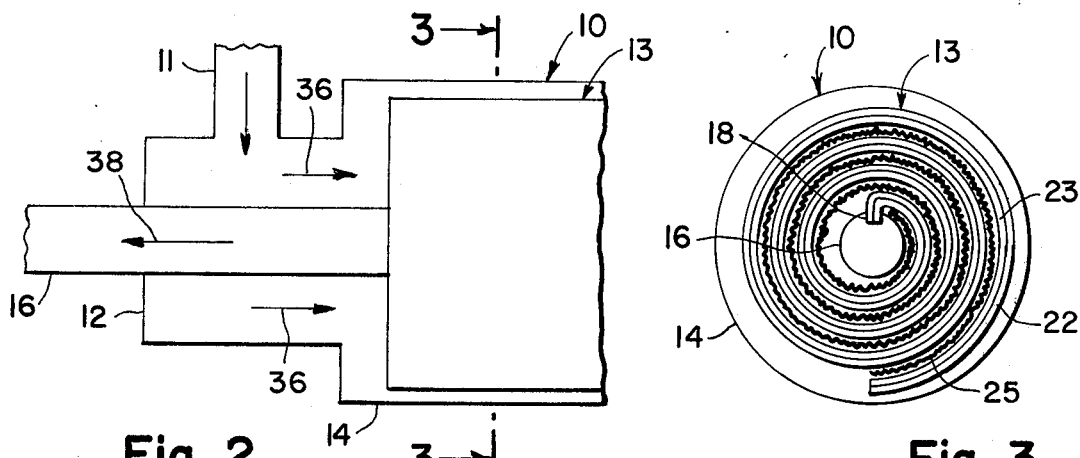
FIG. 2 is an enlarged sectional view of a portion of the filtration apparatus according to the present invention and schematically depicted within the circle of FIG. 1.
FIG. 3 is a sectional view taken along line 3—3 of FIG 2.

FIG. 2, an enlarged sectional view of the portion of the system of FIG. 1 indicated by circle 2, illustrates the manner in which the water or other fluid medium to be filtered, under suitable pressure, enters the pre-ultrafilter 10 through entry port 11. The fluid medium then flows through manifold 12 and enters the leftmost end of module outer casing 14 which encloses the spirally wound microporous filter assembly 13. The fluid medium then flows longitudinally along the interior of casing 14 and between the various layers of the spiral wound microporous filter assembly 13 entering the microporous material of the filter assembly 13 along a direction generally normal to the longitudinal axis (not shown) of the module 10.

Figure 4:
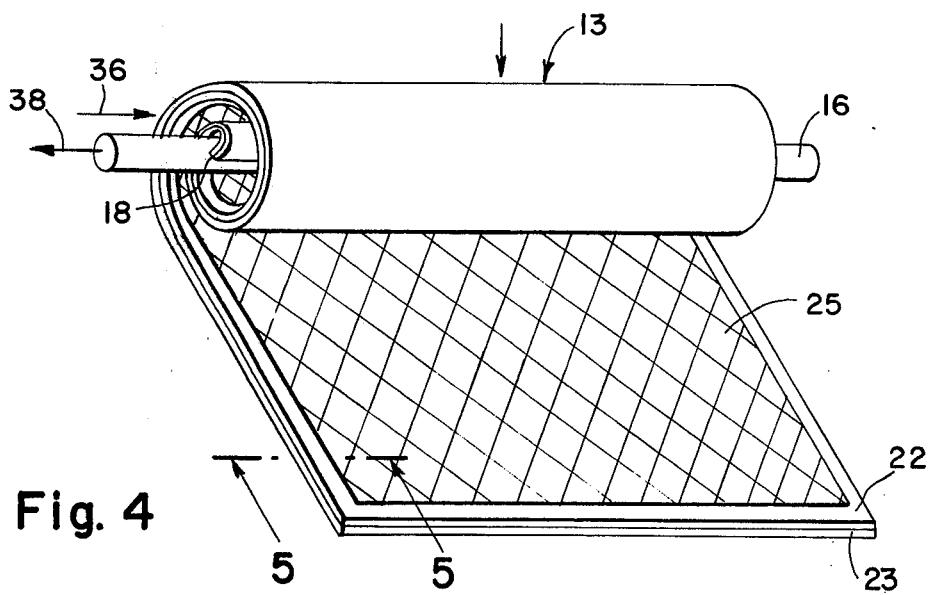
FIG. 4 is a perspective view schematically depicting the filtration apparatus of the present invention.
Figure 5:
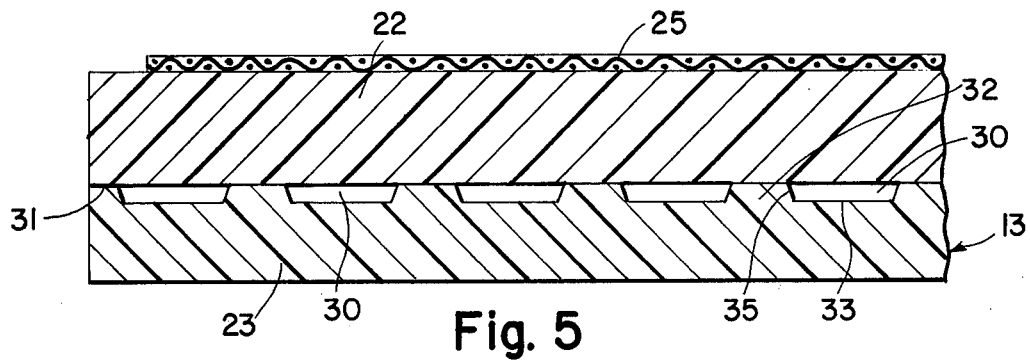
FIG. 5 is a partial sectional view taken along line 5—5 of FIG. 4.

As best seen in FIGS. 3-5, the microporous filter assembly 13 comprises two similarly sized, rectangularly shaped sheets of microporous material 22, 23 which are coextensively superposed relative to each other and bonded together along three corresponding peripheral edges thereof with the fourth or unbonded edge being received within longitudinally extending slot 18 provided in collection or delivery tube 16. The sheets 22, 23 of microporous material are preferably of the type fully described in U.S. Pat. No. 3,862,030 in the name of Bruce S. Goldberg and assigned to the same assigned as the present application. The aforementioned U.S. Pat. No. 3,862,030 is thereby incorporated herein by this reference and made part of this disclosure.

As described in Goldberg U.S. Pat. No. 3,862,030, each sheet of microporous filter material 22 and 23 may comprise a polymeric resinous matrix (e.g., polyvinyl chloride) with inorganic filler particles (e.g., silica) dispersed throughout the resinous matrix and a network of micropores formed between adjacent particles of the dispersed filler, between particles of dispersed filler and the resinous matrix, and in the resinous matrix itself, with the size distribution of the micropores ranging from about 0.01 microns to about 100 microns. Due to the presence of these micropores, and their relatively wide pore size distribution, the porosity of the microporous ultrafilter material is extremely high, ranging from about 50% to about 70% Also, as a result of the inherent physical properties of the polymeric resinous material, the microporous filter material possesses excellent dimensional stability and strength.

In accordance with the disclosure in the aforementioned Goldberg U.S. Pat. No. 3,862,030 the microporous filter material may be fabricated in semirigid sheet form of desired thickness by admixing suitable quantities of a finely divided polymeric resin, finely divided inorganic fillers, a solvent (i.e., cyclohexanone) and a non-solvent (e.g., water), extruding the mixture to form a substantially planar sheet, leaching out the solvent in an aqueous bath and then drying the sheet in an air oven to remove all traces of moisture.

These same procedures may be followed in preparing microporous filter sheets 22 and 23 employed in the present invention. At least one of these sheets, sheet 23, for example, is extruded through a suitable forming apparatus or die so as to form on one side thereof a plurality of spaced, substantially parallel channels 30 separated by a corresponding plurality of spaced substantially parallel ribs 32 as indicated in FIG. 5. The channels 30 and the ribs 32 extend longitudinally in such a manner as to be generally normal to the unbonded or fourth edge common to the sheets 22, 23, said fourth edge being received within slot 18 of the tube 16, as shown in FIG. 4.

As mentioned above, at least two sheets of microporous filter media 22 and 23 are coextensively superimposed relative to each other to form filtration assembly 13 with sheets 22 and 23 being bonded together along at least three of their correspondng peripheral edges. In this regard, any system-compatible adhesive composition may be employed, such as, for example, a latex, a solvent based adhesive or a cross-linkable system adhesive. Preferred adhesives include polyvinyl chloride pipe cement, particularly CELANESE Type 80P pipe cement, epoxies such as, for example, Hardman EPOSET epoxy.

It will be understood that the thickness of sheets 22 and 23 and their length and width, as well as the dimensions of the channels 30 may vary substantially depending upon the requirements of the system. For example, when sheets 22, 23 having a thickness ranging from about 0.11 inches to about 0.015 inches are chosen, the depth of each channel may range from between about 0.005 inches to about 0.010 inches and the width of the channels 30 measured at the interface 32 between the two sheets of filter media 22 and 23 is preferably between about 0.010 inches and about 0.020 inches. Channels 30 offer excellent fluid flow properties in a direction generally normal to the thickness of sheets 22, 23 yet do not limit the structural strength of the filter material. Additionally, it has been found that superior fluid flow properties result when the sidewalls 35 of channels 30 extend from the bottom surface 33 of channels 30 at an angle other than 90°, and, as such, an angle of about 110° is preferred as shown, for example, in FIG. 5.

In the spiral wound filtration assembly shown in FIGS. 3 and 4, two microporous filter media sheets 22 and 23 are spirally wound about center tube 16 which preferably is molded from an inert material such as, for example, polyethylene, polypropylene or stainless steel. Here again the dimensions of center tube 16 are not critical and may vary widely. Generally speaking, when employing sheets 22, 23 of the size mentioned above, the use of a center tube 16 having an inner diameter of about 0.5 inches and having a wall thickness of about 0.125 inches have been found to be satisfactory. Center tube 16 also contains a longitudinally extending slot 18 of such dimension and configuration as to receive securely the unbonded edge of sheets 22 and 23. Sheets 22 and 23 are then spirally wound about center tube 16 with each layer of sheets 22 and 23 being separated by a spacing material 25. Spacing material 25 preferably is of mesh-like construction fabricated from any suitable inert material such as, for example, DuPont's VEXAR polypropylene mesh.

The number of spiral turns or windings of assembly 13 is strictly a matter of choice, although it should be observed that the flow through rate of the assembly 13 is directly dependent upon the number of windings. As such, where a greater flow rate is desired, it would be advantageous to have a greater number of windings.

In the spiral wound configuration shown in FIGS. 3-5, the water or other fluid medium enters the spirally wound microporous filter assembly in the direction of arrows 36 (FIG. 2), and flows between the various spiral windings of the assembly 13 by virtue of the spacer material 25. The fluid being filtered then passes through each sheet 22, 23 in a direction generally normal to channels 30 prior to entering such channels. It will be appreciated that as the fluid passes through each sheet 22, 23 toward and into channels 30, it is filtered, i.e. suspended particles are removed from the fluid as fully described, for example, in the Goldberg U.S. Pat. No. 3,862,030. The filtered fluid or filtrate is then directed along and within channels 30 in a path defined by the spiral turns of the assembly 13, whereupon it eventually enters center tub 16 through longitudinal slot 18, the filtrate finally being directed out through the tube 16 in the direction of arrow 38 (FIG. 2) for subsequent delivery in and to reverse osmosis module 20 (see also FIG. 1).

Figure 6:
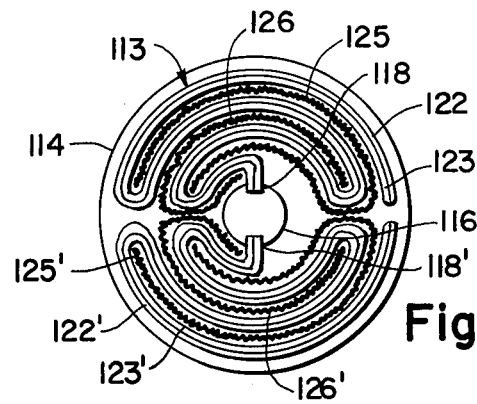
FIG. 6 schematically illustrates in view another alternatively preferred form of the filtration apparatus of the present invention.

Turning now to FIG. 6, there is shown an alternative embodiment of the present invention wherein two sheets of microporous filter media 122 and 123 are bonded together as described above and are disposed within filter media outer casing 114 in a serpentine wound or folded configuration rather than the spirally wrapped configuration of FIG. 4. Serpentine wound filter assembly 113 consists of at least two sets of such serpentine wound filter subassemblies, each consisting of at least a pair of microporous filter media sheets 122, 123 and 122', 123', respectively, the construction and composition of which are similar to filter media sheets 22 and 23 of the spiral wound filter assembly of FIGS. 4 and 5. That is, filter media sheets 123 and 123', contain on their inner surfaces respectively, a plurality of spaced parallel, longitudinally extending channels adapted to permit the passage of the filtrate along and within these channels for eventual delivery into center tube 116. In order to facilitate the flow of the fluid medium being filtered between the individual folds of each serpentine filter subassembly, it has been found expedient to provide two separate sheets of mesh-like spacing material 125, 126 and 125', 126' disposed substantially as shown in FIG. 6; the mesh-like spacing material, being of similar construction and composition as spacing maaterial 25 of the spiral wound filter assembly 13. Center tube 116 is also similar to center tube 16 of the spiral wound assembly 13, however, it contains at least two longitudinally extending slots 118, 118', substantially as shown in FIG. 6, to receive the unbonded edges of sheets 122 and 123 and 122' and 123', respectively.

It will be appreciated that in the serpentine wound filter assembly 113, the water or other fluid medium which, under a suitable drive pressure, enters the leftmost side of outer casing 114, generally flows in the direction of arrow 36, as in FIG. 2, and travels along the longitudinal extent of the outer casing and between the various serpentine folds of each filter subassembly, eventually passing through the thickness of the sheets 122 and 123 and 122' and 123'. The filtrate enters the channels (i.e., channels 30 of FIG. 5) in sheets 123, 123' and is drawn along and within the channels, finally being delivered into center tube 116 through slots 118, 118', whereupon the filtrate may be directed to a reverse osmosis module or modules or other means for distribution and collection.

Figure 7:
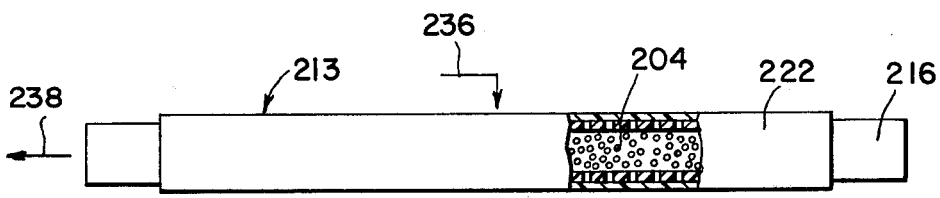
FIG. 7 schematically illustrates in view another alternatively preferred form of the filtration apparatus of the present invention.

FIG. 7 illustrates still another alternative embodiment of the present invention wherein at least one unchanneled sheet of microporous filter media 222, of the same composition and construction as the unchanneled sheets 22 and 122, 122' of the two previously described embodiments, is circumferentially wrapped about the exterior of a center tube 216, also of essentially the same composition and construction as center tube 16 of FIG. 4. Center tube 216 does not however, contain a longitudinally extending slot or slots, as do center tubes 16 and 116. Instead, microporous filter media sheet 222 is adhesively bonded along a pair of opposed edges or otherwise formed into a tubular sleeve with center tube 216 being telescopically inserted within the tubular sleeve to form an externally wrapped filter assembly 213 substantially as shown in FIG. 7.

In this particular alternatively preferred embodiment, the water or other fluid medium being filtered is introduced along the longitudinal extent of filter media sheet 222, passing through the sweet 222 in the general direction indicated by arrow 236 (FIG. 7) with the filtrate entering center tube 216 through a plurality of perforations 204 provided in center tube 216. The perforations 204 may be of any suitable size so long as they do not prevent the center tube 216 from providing adequate structural support for filter media sheet 222. After passing through the perforations 204, the filtrate is then directed along center tube 216 for collection and distribution or for delivery to another processing apparatus such as, for example, a membrane module or modules in a reverse osmosis system.

Figure 8:
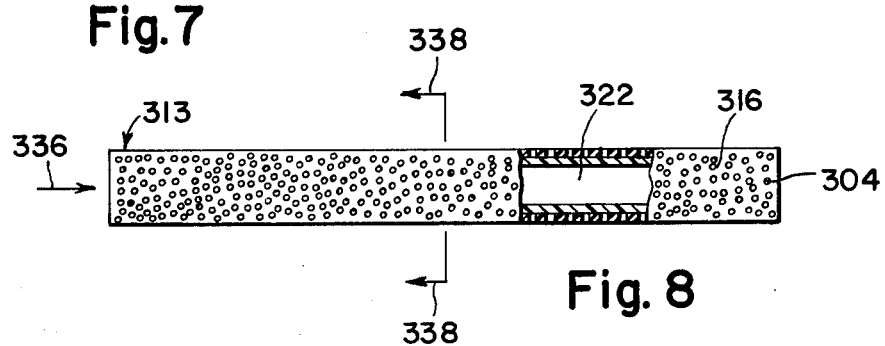
FIG. 8 schematically illustrates in view still another alternatively preferred form of filtration apparatus of the instant invention.

FIG. 8 is illustrative of yet still another alternatively preferred embodiment of the present invention wherein at least one sheet of unchanneled microporous filter media 322 of the same composition and construction as filter media sheet 222 of the embodiment of FIG. 7 is circumferentially wrapped to form a tubular sleeve which is then disposed internally within a perforated center tube 316, of the same composition and construction as center tube 216 in FIG. 7 to form an internally wrapped filter assembly 313. Filter media sheet 322 should conform to the inner walls of center tube 316 and may be adhesively bonded to the center tube 316 along its opposed peripheral edges adjacent to the correspondng opposed extremities of the center tube 316. In the operation of the embodiment of FIG. 8, water or other fluid medium is introduced under pressure through the central bore defined by the tubular sleeve of microporous filter media 322, and passes outwardly through microporous sheet 322. The filtrate then passes through perforations 304 where it is collected and distributed or delivered to another processing apparatus.

It is understood that the filter assemblies 213 and 313 of FIGS. 7 and 8, respectively, are preferably encased and supported within an outer module casing, similar in design and construction to the outer casing 14 shown in FIG. 2. When such an outer casing 14 (FIG. 2) is used to encase and support the externally wrapped filter assembly 213 of FIG. 7, the water or other fluid medium enters the module through an entry port similar to entry port 11 of FIG. 2 and enters the filter assembly 213 in the direction of arrow 236 with the filtrate being collected in the center tube 216 and being directed out through the center tube 216 in the direction of arrow 238 for subsequent delivery into, for example, a reverse osmosis module. When the internally wrapped filter assembly 313 of FIG. 8 is contained within and encased by an outer casing of the construction and design of outer casing 14 of FIG. 2, the water is pumped in the direction of arrow 336 through the center tube 316 with the filtrate being directed in the direction of arrows 338 through a port similar to entry port 11 of FIG. 2 for subsequent delivery into, for example, a reverse osmosis module.

Having thus described the invention with particular reference to the preferred forms thereof, it will be obvious that various changes and modifications may be made therein without departing from the spirit and scope of the invention as defined in the appended claims.

Wherefore, I claim:

1. Filtration apparatus comprising:
   a. tubular means, having at least one longitudinally extending slot therein for receiving a filtrate; and
   b. filter means, said filter means being disposed in a plurality of separate layers relative to said tubular means, said filter means comprising at least a pair of microporous members, said members being coupled together along a plurality of peripheral edges and defining at least a pair of uncoupled edges, said at least pair of uncoupled edges being adapted to engage sealing with said slot, and wherein at least one member of said pair of microporous members includes a plurality of spaced longitudinal extending channels reposed on a surface thereof between said coupled members for directing a filtrate into said tubular means through said slot; and
   c. spacing means for separating said spearate layers of said filter means from one another; and for conveying unfiltered fluid between said layers.

2. The filtration apparatus, as recited in claim 1 further comprising:
   a. input and output means, respectively adapted for introducing said unfiltered fluid to said filter means, and for directing said filtrate away from said filter means.

3. The filtration apparatus, as recited in claim 2, wherein each said member comprises a polymeric resinous matrix with particles of inorganic filler dispersed therein, from which a network of pores are formed between particles of said dispersed filler and between particles of said resinous matrix.

4. A filtration apparatus, as recited in claim 3 wherein said pair are joined along said peripheral edges in substantially coextensive super-position relative to each other, with each member of said pair having at least a pair of opposed surfaces, and wherein said channels extend in a direction generally normal to said pair of uncoupled edges, thereby enabling said channels to receive said filtrate fluid between said opposed surfaces along a direction generally normal to said slot, and to direct filtrate into said tubular means along a path defined by wound turns of said filter means.

5. The filtration apparatus, as recited in claim 4, whrein said matrix is polyvinyl chloride and said filler is silica.

6. The filtration apparatus, as recited in claim 5, wherein said spacing means comprises an inert mesh like material and carries said unfiltered fluid between various said layers of said pairs.

7. The filtration apparatus, as recited in claim 6, wherein said input means comprises a first port positioned with respect to at least one of said opposed surfaces, whereby said fluid passes from said one opposed surface to a remaining opposed surface thereby enabling filtration to occur.

8. The filtration apparatus, as recited in claim 7, wherein said tubular means is a generally, centrally, longitudinally, positioned manifold.

9. The filtration apparatus, as recited in claim 3, wherein said output means comprises a port for supplying said filtrate to a reverse osmosis means cooperatively connected thereto.

10. A filtration apparatus, as recited in claim 9, wherein said reverse osmosis membrane means comprises:
    a. at least one semipermeable membrane;
    b. at least one porous support member for supporting said membrane; and
    c. at least one porous backing member for supporting said semipermeable membrane and said support member.

11. The filtration apparatus, as recited in claim 3, wherein said filter means is spirally wound about said manifold.

12. The filtration apparatus, as recited in claim 3, wherein said filter means is disposed relative to said manifold in a serpentine fashion.

* * * * *